United States Patent
Saarem et al.

(10) Patent No.: US 7,131,671 B2
(45) Date of Patent: Nov. 7, 2006

(54) TRANSPARENT COUPLING

(76) Inventors: Myrl J. Saarem, 2057 W. Washington St., Carson City, NV (US) 89703; Arlen K. Bean, 1840 Manzanita La., Reno, NV (US) 89509

( * ) Notice: Subject to any disclaimer, the term of this patent is extended or adjusted under 35 U.S.C. 154(b) by 0 days.

(21) Appl. No.: 11/030,758

(22) Filed: Jan. 7, 2005

(65) Prior Publication Data
US 2006/0151995 A1    Jul. 13, 2006

(51) Int. Cl.
*F16L 21/00* (2006.01)
(52) U.S. Cl. .................. 285/93; 285/417; 285/104
(58) Field of Classification Search ............. 285/93, 285/417, 369, 104, 105, 382
See application file for complete search history.

(56) References Cited

U.S. PATENT DOCUMENTS

| | | | | |
|---|---|---|---|---|
| 2,624,308 A * | 1/1953 | Wittlin | .................. | 116/276 |
| 2,655,124 A * | 10/1953 | Gary et al. | .................. | 116/276 |
| 2,714,868 A * | 8/1955 | Franck | .................. | 116/276 |
| 2,725,844 A * | 12/1955 | Wittlin | .................. | 116/276 |
| 2,843,078 A * | 7/1958 | Wittlin | .................. | 116/276 |
| 3,378,282 A * | 4/1968 | Demler, Sr. | .................. | 285/148.13 |
| 3,381,976 A * | 5/1968 | Goodson | .................. | 285/18 |
| 3,585,963 A * | 6/1971 | Hiszpanski | .................. | 116/206 |
| 3,594,021 A * | 7/1971 | Williams | .................. | 285/302 |
| 3,650,549 A * | 3/1972 | Pepper | .................. | 285/27 |
| 3,841,668 A * | 10/1974 | Williams | .................. | 285/93 |
| 3,976,314 A * | 8/1976 | Graham | .................. | 285/238 |
| 4,073,514 A * | 2/1978 | Pate | .................. | 285/149.1 |
| 4,092,193 A * | 5/1978 | Brooks | .................. | 156/83 |
| 4,469,357 A * | 9/1984 | Martin | .................. | 285/381.3 |
| 4,602,807 A * | 7/1986 | Bowers | .................. | 285/45 |
| 4,783,099 A * | 11/1988 | Muser | .................. | 285/7 |
| 4,800,926 A * | 1/1989 | Beck | .................. | 138/106 |
| 4,888,990 A * | 12/1989 | Bryan et al. | .................. | 73/326 |
| 4,896,902 A * | 1/1990 | Weston | .................. | 285/93 |
| 4,934,743 A * | 6/1990 | Kapgan et al. | .................. | 285/23 |
| 5,015,015 A * | 5/1991 | Fetters | .................. | 285/114 |
| 5,078,433 A * | 1/1992 | Morse et al. | .................. | 285/281 |
| 5,118,139 A * | 6/1992 | Lott | .................. | 285/15 |
| 5,531,695 A * | 7/1996 | Swisher | .................. | 604/111 |
| 5,947,532 A | 9/1999 | Lorenz | | |
| 6,145,896 A * | 11/2000 | Vitel et al. | .................. | 285/414 |
| 6,231,090 B1 | 5/2001 | Fukao et al. | | |
| 6,443,500 B1 * | 9/2002 | Inoue et al. | .................. | 285/307 |
| 6,467,506 B1 * | 10/2002 | Nguyen | .................. | 138/104 |
| 6,517,122 B1 * | 2/2003 | Minemyer | .................. | 285/328 |
| 6,637,780 B1 * | 10/2003 | Miyajima et al. | .................. | 285/305 |
| 6,663,145 B1 | 12/2003 | Lyall et al. | | |
| 6,913,292 B1 * | 7/2005 | Snyder et al. | .................. | 285/340 |
| 2002/0185861 A1 * | 12/2002 | Inoue et al. | .................. | 285/3 |
| 2004/0237632 A1 * | 12/2004 | Van Keeken | .................. | 73/46 |

OTHER PUBLICATIONS

Brochure from Cabletec®—Title:"Barbed Ring Compression Couplings:", Inside Page, © 1999 Cable Tec.

* cited by examiner

*Primary Examiner*—James M. Hewitt

(57) ABSTRACT

A transparent coupling for joining the ends of relatively soft plastic conduit. Visual inspection through the coupling affords confidence that the conduits have been installed in their proper position within the coupling. Internal circumferential barbs of the coupling penetrate the conduit and secure the conduit within the coupling and also provide a seal between the conduit and the coupling.

3 Claims, 3 Drawing Sheets

TRANSPARENT COUPLING

FIELD OF INVENTION

The present invention relates to joining one relatively soft plastic conduit to another with a transparent coupling. The transparent coupling allows visual confirmation that the conduit ends are properly located within the coupling after installation. The present invention finds particular utility in coupling collinear high-density polypropylene or polyethylene conduits that house fiber optic cables, electric cables and the like.

BACKGROUND ART

High-density polypropylene and polyethylene conduit are often laid underground in long lengths. Splices are required to join one length of conduit to the next. Fiber optic cables, or the like, are then installed in the length of conduit. Relatively smooth interior surfaces are required throughout the conduit length, including the splices, in order to facilitate the installation of the cable. The joints or splices need to be nearly leakage free since air pressure is often used to install (blow) the cable through the conduit. Therefore, the coupling must not obstruct the interior surface of the conduit and must provide a nearly leakage free joint.

U.S. Pat. No. 6,663,145 issued to Lyall et al, U.S. Pat. No. 6,231,090 issued to Fukao et al, and U.S. Pat. No. 5,947,532 issued to Lorenz are all examples of such couplings.

Another example is shown in a brochure from Cabletec®, with a title "Barbed Ring Compression Couplings", which describes a coupling that joins the ends of two relatively soft plastic conduits. Internal circumferential barbs are provided that grip the inserted conduit and provide separation resistance to axial forces that can be applied to the conduit. Additionally, the barbs provide a seal to prevent air escape during cable installation and to prevent contaminants from entering the conduit. Central to the inside diameter of the coupling is an internal flange that limits the distance of insertion of the conduit from either end of the coupling. The coupling is made of aluminum alloy. Generally, an appropriate tool or mechanism is used to force the conduit into the coupling during the installation process.

A significant element that is missing in these referenced couplings is the lack of ability to know when the conduit is properly engaged into the coupling.

SUMMARY OF THE INVENTION

In accordance with the present invention, a coupling is provided that is fabricated from relatively transparent plastic. A tubular shape is provided to join the ends of two conduits in a rigid and sealed manner. Multiple internal circumferential barbs are provided in the coupling that dig into the conduit when the conduit is inserted into the coupling, thereby providing both a sealed joint and a joint of excellent resistance to separation forces. The coupling material of choice is significantly harder than the soft plastic material of the conduit. It also is adequately transparent to allow visual verification of the location of the conduit ends.

In another configuration of the invention, a metal sleeve is pressed into each end of the transparent coupling. The metal sleeve has external circumferential barbs that dig into the transparent coupling. Internal circumferential barbs in the metal sleeve are also provided that dig into the soft plastic conduit when installed. The lengths of the metal sleeves are such that a central window of the transparent plastic coupling provides visual verification of the location of the conduit ends during and after installation.

In yet another configuration of the invention, a transparent sleeve is provided over and sealed to a metal tube fabricated with strategic windows that allow visual verification of the location of the conduit ends during and after installation.

Thus, a coupling is provided that allows visual confirmation that proper conduit installation exists, rigidly couples the ends of the conduit, prevents leakage in and out of the conduit, and is inexpensive to manufacture.

DETAILED DESCRIPTION OF THE INVENTION

Figure 1:
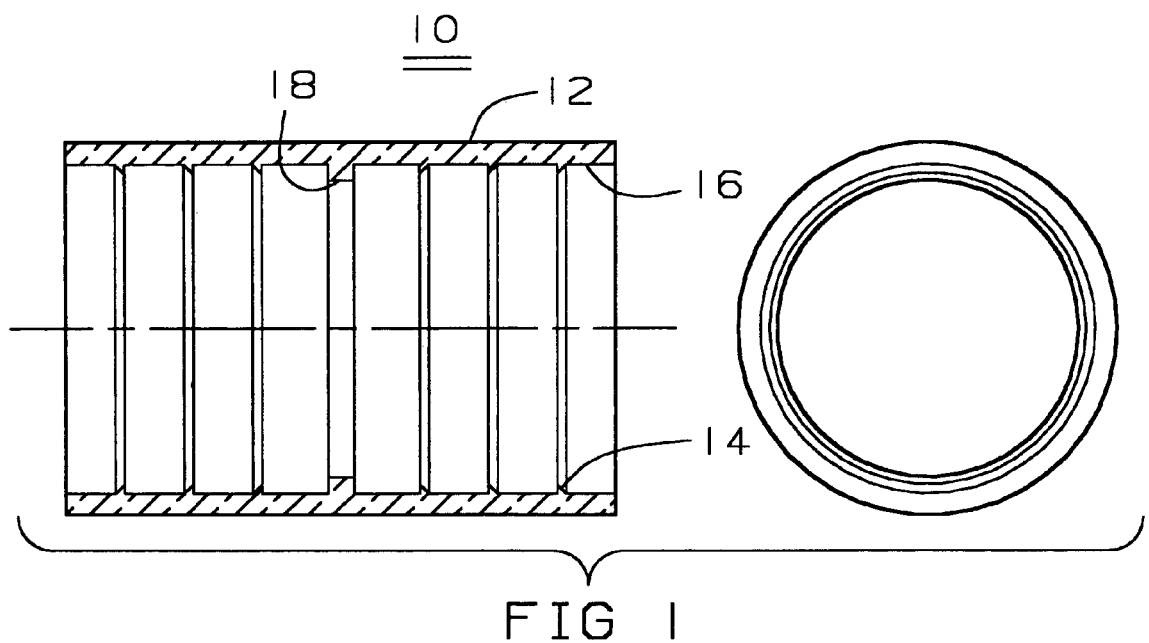
FIG. 1 is an end view and cross section of the present invention

In FIG. 1 the coupling 10 is shown in an end view and a cross-section view. Coupling 10 may be a simple tube 12 with internal detail as will be described. Multiple internal circumferential barbs 14 are positioned on the internal diameter 16 of tube 12. At the approximate center of tube 12 internal to diameter 16 is an internal flange 18.

Figure 2:
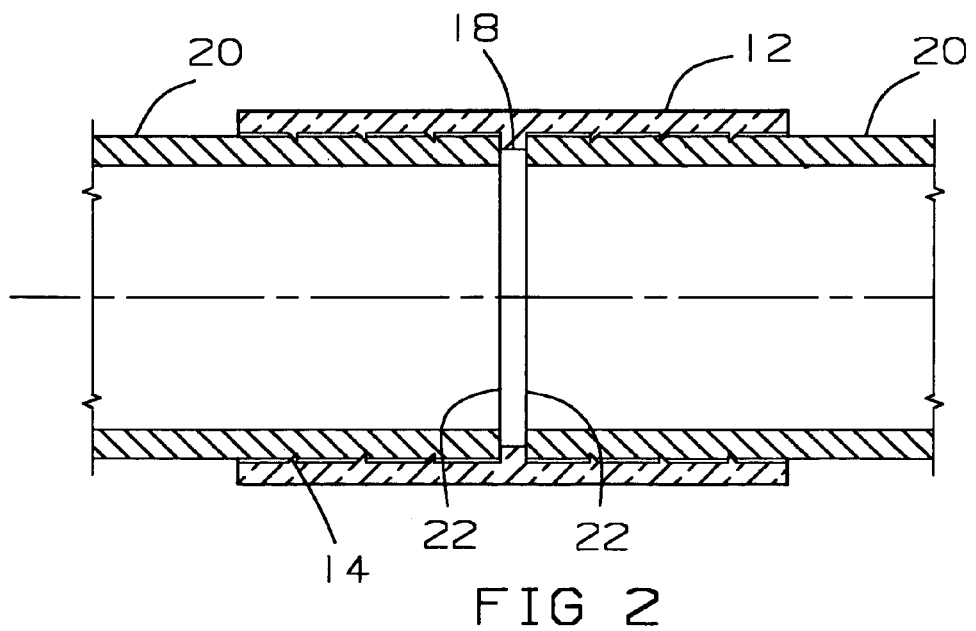
FIG. 2 is a cross sectional view of the present invention with conduit ends properly installed.

FIG. 2 shows the position of connected conduits 20 when properly installed. Properly installed ends of conduits 22 abut the flange 18. This fact can be verified visually since tube 12 is transparent. Barbs 14 dig into the outside diameter of conduits 20 and prevent leakage either out of or into the conduits 20 and also provide adequate resistance to any removal forces applied to conduits 20.

Figure 3:
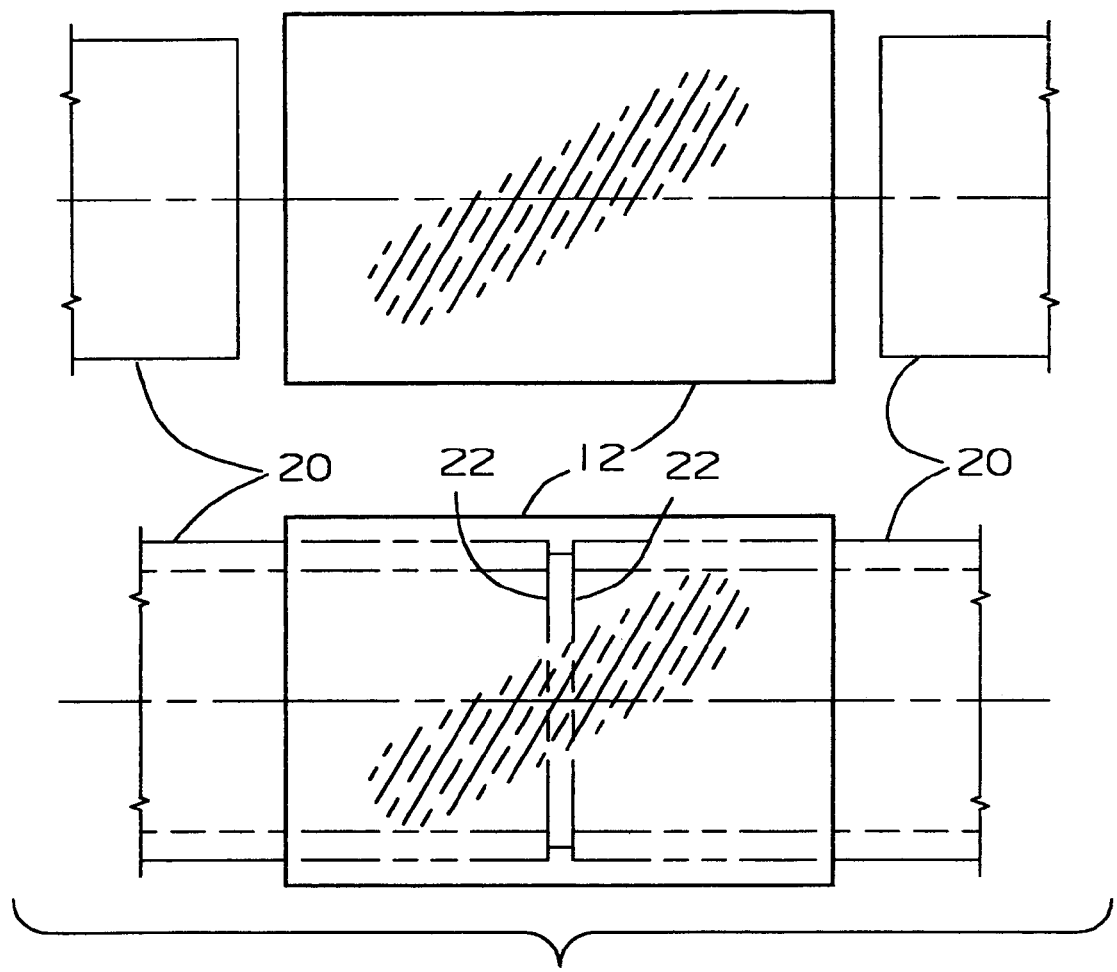
FIG. 3 is a plan view showing conduits about to be inserted in the coupling and another view showing the conduits installed with representation of visual installation confirmation.

FIG. 3 shows conduits 20 about to be installed in tube 12, and also conduits 20 installed in tube 12 with witness lines showing visually the position of the ends 22 of conduits 20 as seen through transparent tube 12.

A material of choice, from which to make coupling 10, is polycarbonate plastic because of its high strength, good transparency and relatively high hardness. Other plastic materials or combination of materials may be used as will be explained.

Figure 4:
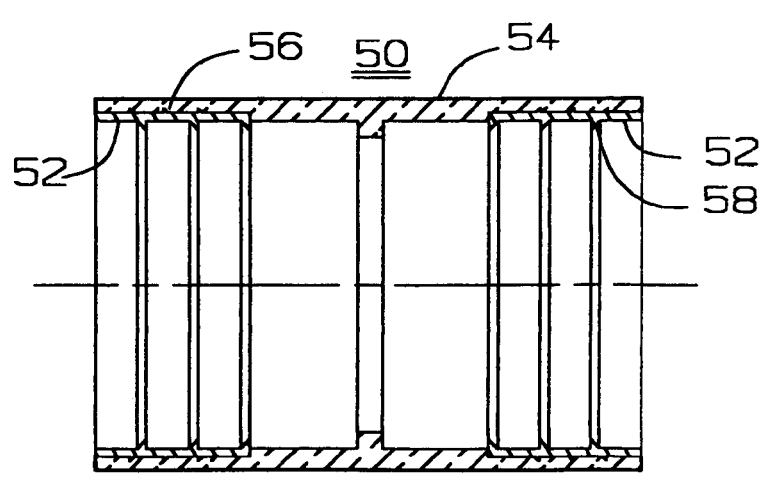
FIG. 4 is a cross sectional view of another version of the invention utilizing metal inserts in both ends of the coupling.

FIG. 4 shows coupling 50 with metal sleeve 52 installed in both ends of transparent tube 54. Multiple external circumferential barbs 56 secure sleeve 52 in tube 54. Multiple internal circumferential barbs 58 provide gripping interference with conduits 20 (not shown). The length of sleeves 52 are designed to leave an ample transparent window through transparent tube 54 to assure visual confirmation of proper installation of conduits 20 (not shown). In this invention the transparent plastic material need not be significantly harder than the conduits 20 material since the loads and sealing are achieved between metal and plastic parts. Consequently, less expensive transparent material may be used.

Figure 5:
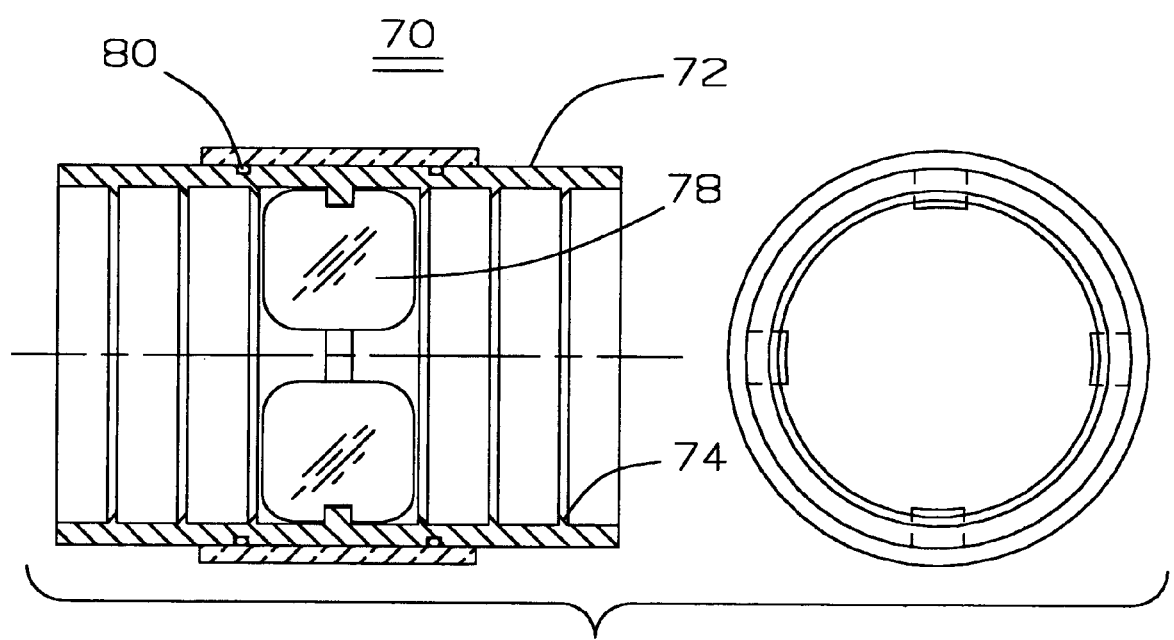
FIG. 5 is an end view and a cross section of another version of the invention where a transparent sleeve surrounds a metal tube with widows for verification of proper installation of the conduits.

Yet another form of the invention is shown in FIG. 5 as coupling 70. Metal tube 72 contains multiple circumferential internal barbs 74 to provide gripping interference and sealing with conduits 20 (not shown). Metal tube 72 is fabricated with multiple windows 78 in the location where the ends of conduits 20 (not shown) are intended to reside after installation. Transparent sleeve 76 fits over and is centered on tube 72 covering windows 78. Elastomeric seals 80 create a seal between transparent sleeve 76 and tube 72. Thus, visual inspection of the installation is achieved through transparent sleeve 76 and windows 78.

CONCLUSION

The couplings, herein described, offer a distinct advantage over prior art because of the user's ability to visually inspect the coupled joint after joining the ends of two conduits. The couplings are structurally sound, prevent leakage and are economical to manufacture. They provide a smooth transition from conduit to conduit and are well suited for allowing cable insertions in the conduit by conventional processes.

It will be appreciated that while particular embodiments of the invention have been shown and described, modifications may be made. For example, sealing may be accomplished by using elastomeric seals instead of barbs. Further, other means can be used to secure the conduits in the coupling instead of barbs and still provide the ability to inspect the installation by use of transparent plastic materials. It is intended in the claims to cover all modifications that come within the true spirit and scope of the invention.

We claim:

1. A coupling for joining abutting ends of relatively soft plastic conduits, comprising:
    a) a metal tube with windows,
    b) a transparent plastic sleeve concentric with and surrounding said metal tube, and
    c) elastomeric seals between said metal tube and said transparent plastic sleeve,
    wherein said metal tube provides removal resistance means between said conduits and said metal tube, and said removal resistance means provides a sealing means between said metal tube and said conduits, and,
    wherein said elastomeric seals provide a seal between said metal tube and said transparent plastic sleeve,
    whereby verification of proper installation can be visualized through said transparent plastic sleeve and said windows in said metal tube.

2. The coupling of claim 1 wherein said removal resistance means comprises internal circumferential barbs to secure and seal the said conduits in said metal tube.

3. A coupling for joining abutting ends of relatively soft plastic conduits, comprising:
    a) a transparent plastic tube defining a longitudinal axis, and
    b) a metal sleeve inserted inside each end of said transparent plastic tube,
    wherein said metal sleeves provide a removal resistance means between said transparent plastic tube and said conduits and provide a sealing means between said transparent plastic tube and said conduits, and
    wherein said removal resistance means comprises external continuous multiple longitudinally spaced circumferential barbs and internal continuous multiple longitudinally spaced circumferential barbs to secure said conduits in said tube, and to seal and thereby prevent leakage in or out of the said conduits,
    whereby verification of proper conduit installation can be visualized through said transparent plastic tube.

* * * * *